March 19, 1957      R. N. RIBLET      2,785,809
PARKING SYSTEM FOR AUTOMOBILES
Filed Sept. 28, 1953      6 Sheets-Sheet 1
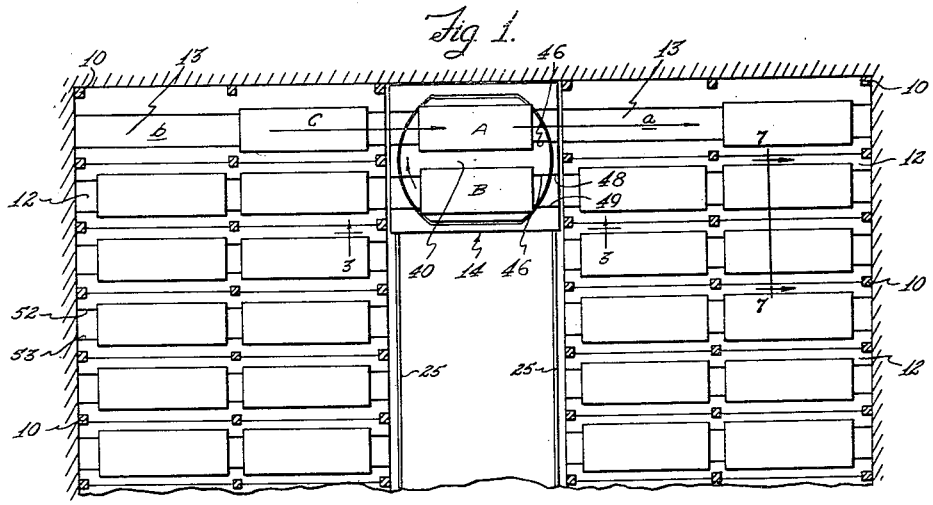
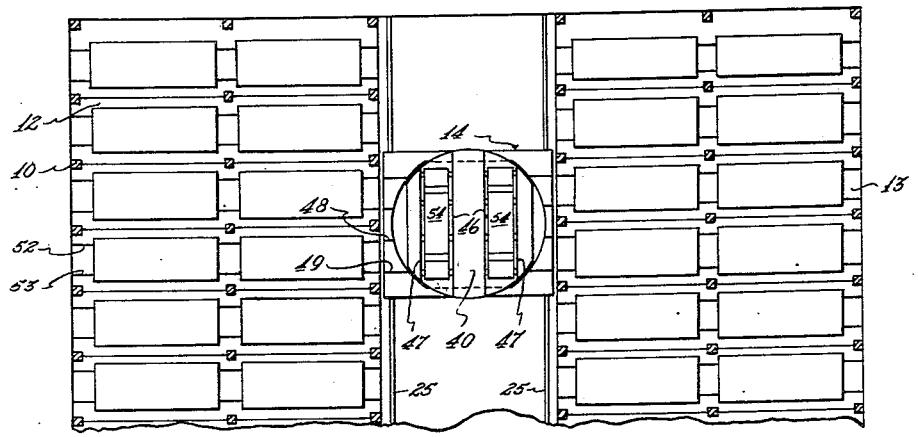
INVENTOR.
Royal N. Riblet
BY
Atty.

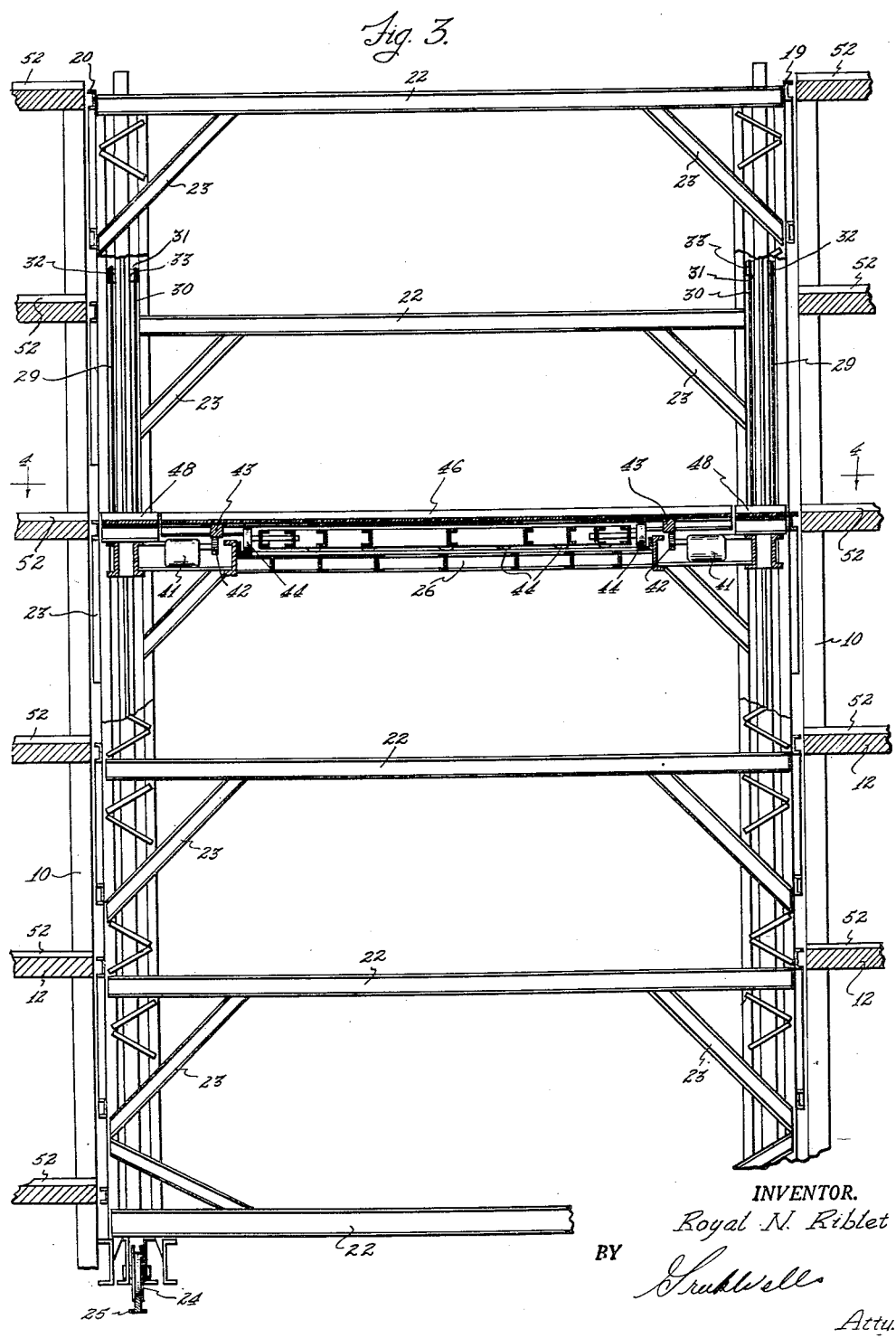

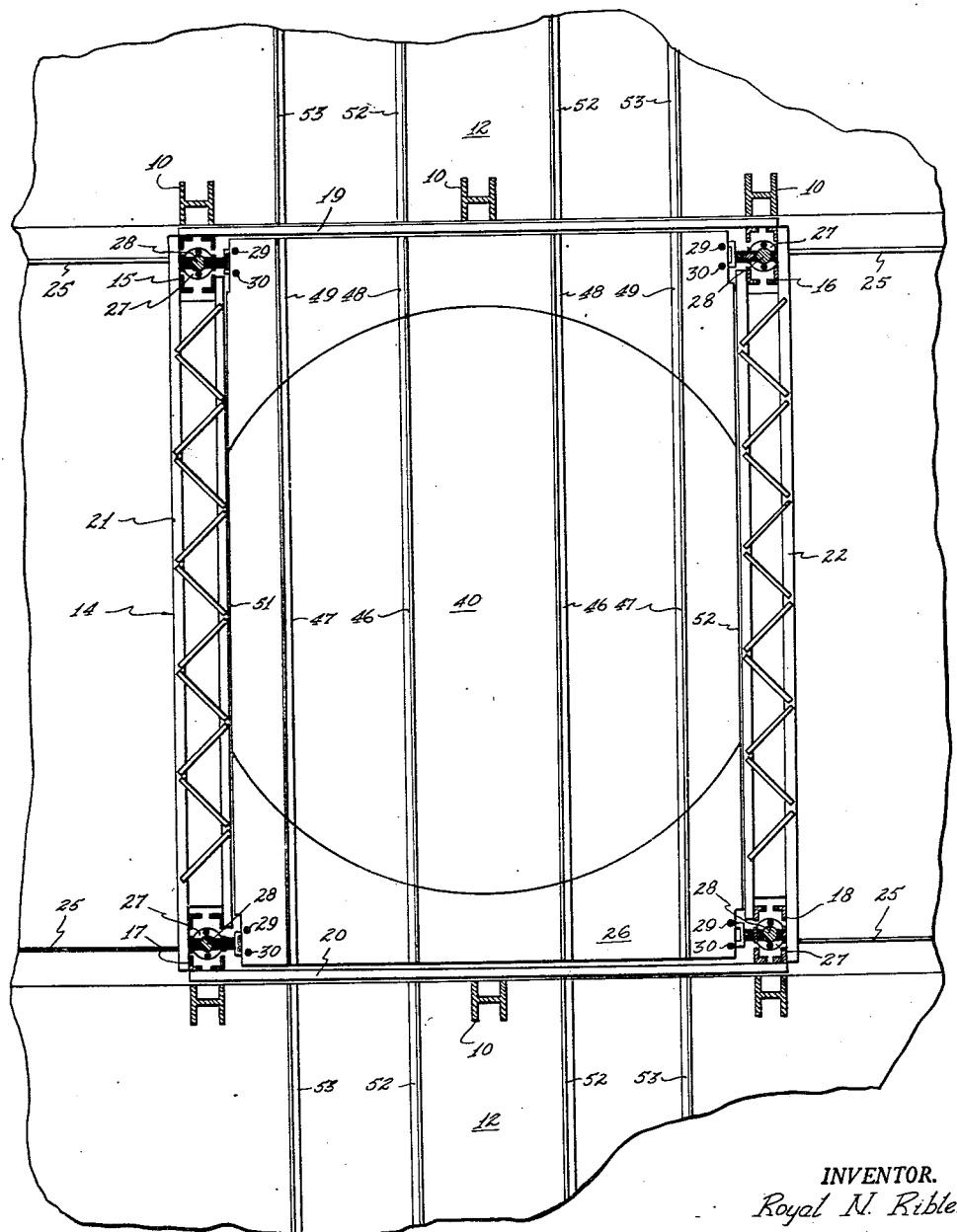

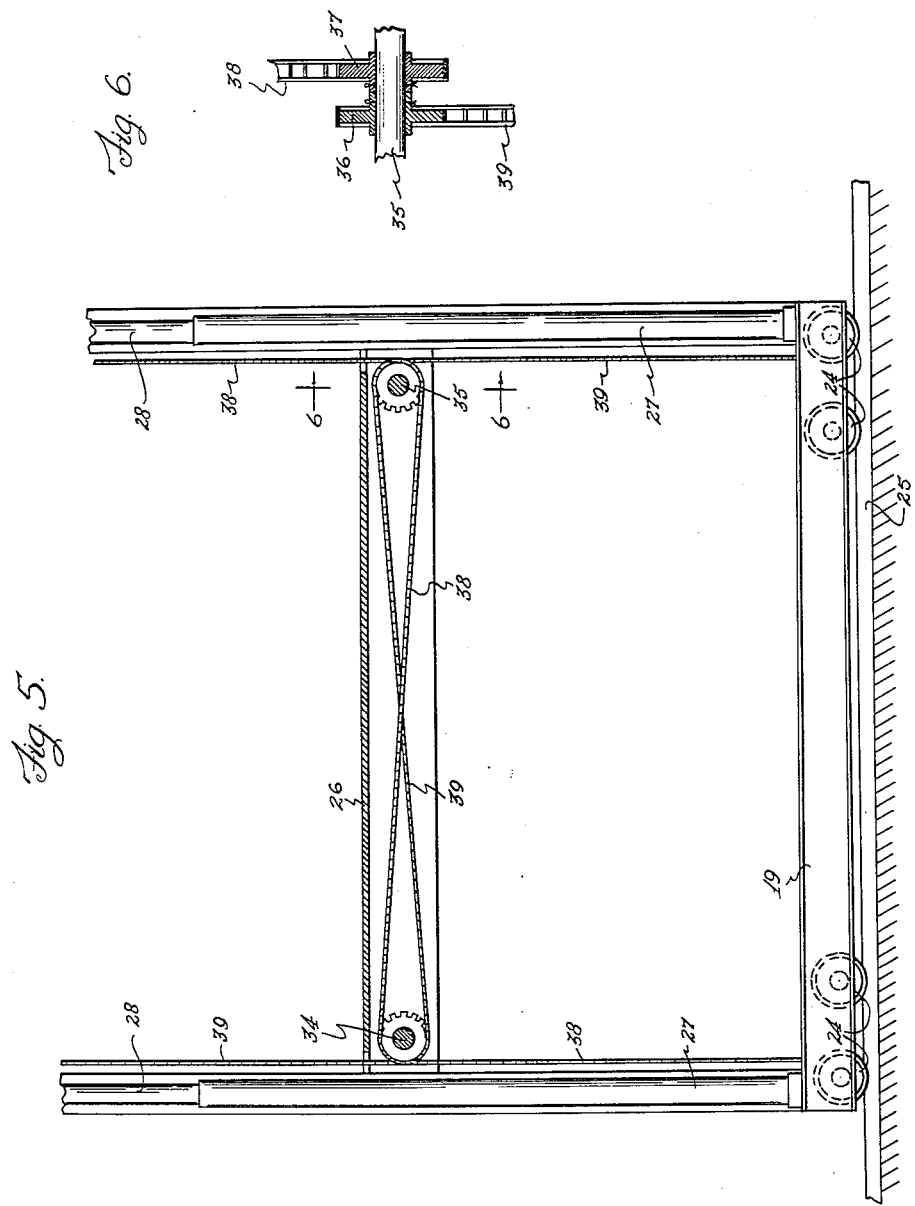

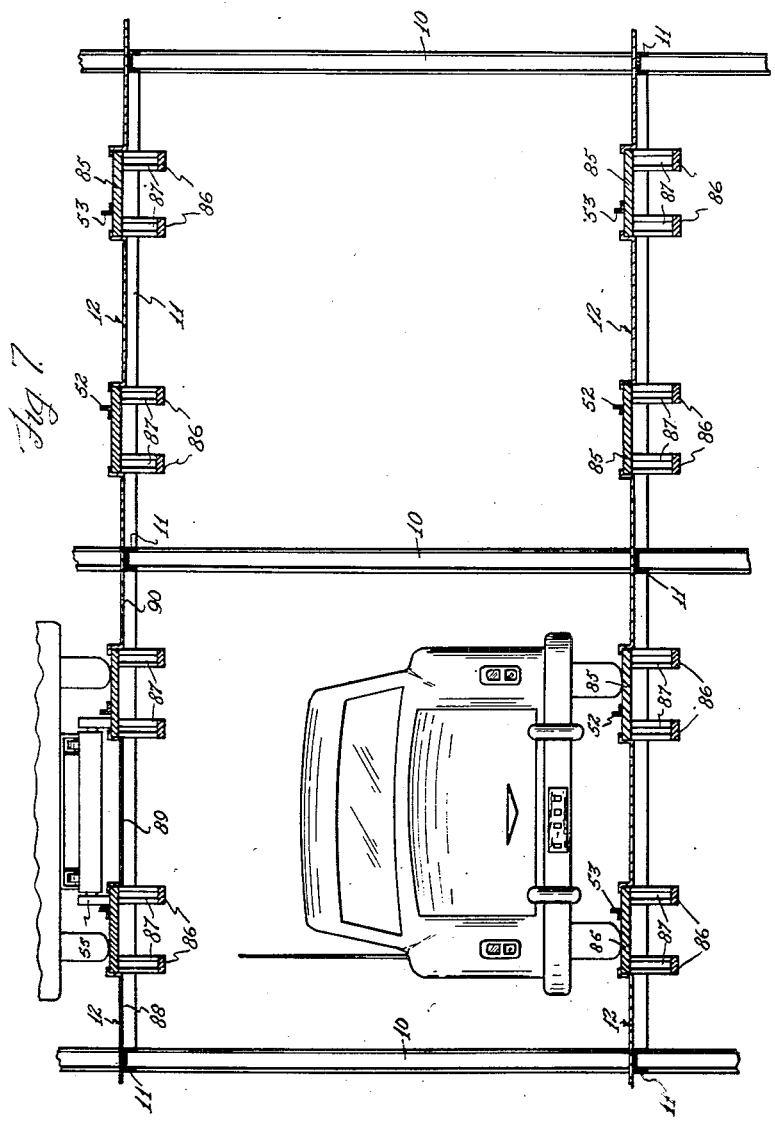

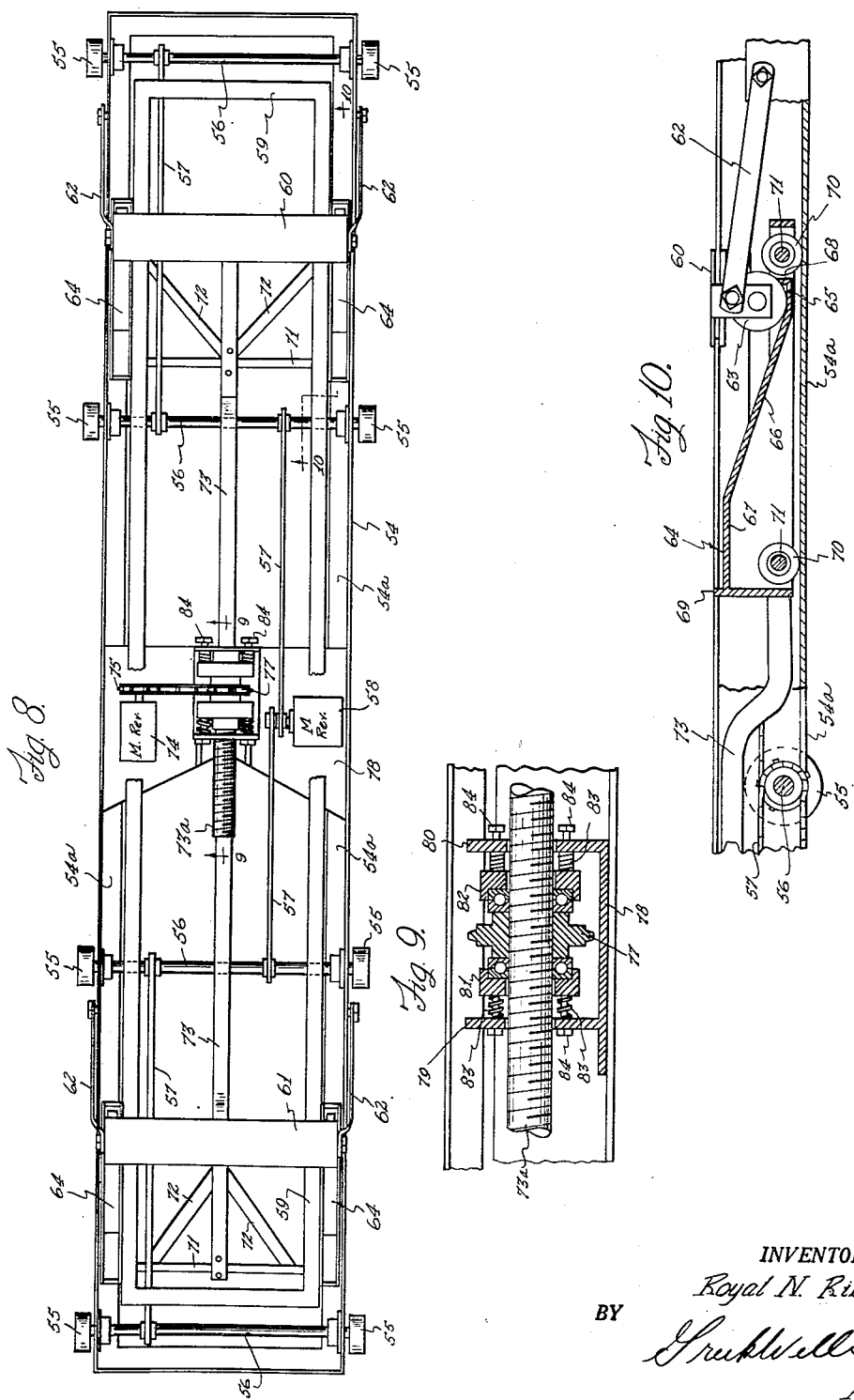

United States Patent Office 2,785,809
Patented Mar. 19, 1957

2,785,809

PARKING SYSTEM FOR AUTOMOBILES

Royal N. Riblet, Spokane, Wash., assignor, by mesne assignments, to Parkmaster Systems Inc., Spokane, Wash., a corporation of Washington Application September 28, 1953, Serial No. 382,543

3 Claims. (Cl. 214—16.1)

My invention relates to improvements in an automotive vehicle parking system.

The parking of automotive vehicles in congested areas continues to be a difficult problem despite the many devices that have been proposed for this purpose. It is the principal purpose of my invention to provide means for parking such vehicles in stalls which are arranged side by side and one over the other which will permit two automobiles to be placed end to end in any stall and picked up from the stall and delivered to a loading and unloading level with a minimum amount of time loss.

More specifically it is the purpose of my invention to provide in a parking system for automobiles, a storage structure having a plurality of bays of stalls in vertically spaced floors, each of said bays comprising two pairs of stalls arranged in side by side relationship with each stall of each pair of stalls communicating with the corresponding stall of the other pair in end to end relationship to provide storage for four automobiles in each bay, together with a non-rotatable elevator platform that is movable vertically across the open ends of the bays of stalls, the elevator platform carrying within its confines a horizontally rotatable platform or turntable, and the rotatable platform having mounted thereon a pair of automobile receiving frames that are arranged in side by side relationship with the spacing of said frames corresponding with the spacing between pairs of stalls in each bay of stalls so that automobiles may be conveyed from the frames of said rotatable platform into either of the pairs of stalls of a bay of stalls or interchanged between pairs of stalls of a bay of stalls without displacing the elevator platform.

My invention contemplates also the provision of the combined bays of stalls, turntable and shuttles referred to above, with means on the shuttle for moving automobiles from the floor of a stall or a loading deck to and from the turntable. The invention contemplates utilization of any suitable elevator for raising and lowering the turntable and for moving the turntable laterally between the two groups of stalls. It is particularly appropriate for congested areas where the ground floor space is limited in width to lot sizes of the order of 50 feet and in lot lengths in the order of 100 feet. Such lot sizes are more readily available in congested areas for use for parking purposes. With my invention, it is possible to store 24 automobiles for each floor level of stalls so that a lot of the size above referred to can handle a maximum of about 120 automobiles with an overall height of about 35 feet, leaving the ground level floor entirely open for loading, servicing and discharging the automobiles.

The detailed objects and advantages of my invention will be more apparent from the following description and the accompanying drawings illustrating a preferred form of the invention. It should be understood, however, that the drawings and description are illustrative only and are not intended to limit the invention except insofar as it is limited by the claims.

In the drawings:

Figure 1 is a somewhat diagrammatic plan sectional view of a parking system embodying my invention;

Figure 2 is a view similar to Figure 1, showing a changed position;

Figure 3 is an enlarged sectional view with parts broken away, taken substantially on the line 3—3 of Figure 1;

Figure 4 is a plan sectional view taken on the line 4—4 of Figure 3;

Figure 5 is a somewhat diagrammatic view illustrating a means for maintaining the elevator platform level;

Figure 6 is a view taken on the line 6—6 of Figure 5;

Figure 7 is an enlarged fragmentary sectional view taken substantially on the line 7—7 of Figure 1;

Figure 8 is a plan view of an automobile lifting and moving device used in the invention;

Figure 9 is an enlarged sectional view on the line 9—9 of Figure 8; and

Figure 10 is an enlarged sectional view on the line 10—10 of Figure 8.

In the following description I shall endeavor to point out the essential parts of the combination that I consider to be my invention. In order to do so certain devices will be described which are not my invention and will be so indicated as clearly as possible. The disclosure of these parts is not an indication that such parts are known to the public.

Referring now to the drawings and particularly to Figures 1 to 4, I have illustrated in these figures a typical arrangement for a small parking space. Supporting columns 10 and beams 11 carry a plurality of floors 12. The columns 10 and the floors 12 are so spaced that they provide spaces 13, wide enough to receive an automobile between each two columns and high enough to receive an automobile between floors. The spaces are long enough to provide ample room for two automobile stalls end to end. For example, in a space one hundred feet long and fifty feet wide, any floor can have a twenty-four foot elevator passageway across it midway between the ends and have spaces long enough between the passageway and the ends of the space easily to accommodate two automobiles end to end.

In order to make use of the two car length stall structure such as that described, I provide a suitable travelling elevator unit 14 which can move along the passageway. The elevator unit includes a framework composed of corner uprights 15, 16, 17 and 18, cross bars 19 connecting the uprights 15 and 16, cross bars 20 connecting the uprights 17 and 18, cross frames 21 connecting the uprights 15 and 17 and cross frames 22 connecting the uprights 16 and 18. The corners between the cross frames and the uprights are braced by diagonal braces 23. The framework just described extends to a height necessary to carry cars to all the floors 12. It is carried on wheels 24 that run on rails 25 in the passageway.

A car platform 26 is mounted for vertical movement in the framework just described. This platform is raised and lowered by a suitable elevating means. The means shown comprises four hydraulic cylinders 27, one in each of the four corner uprights. A piston 28 and two flexible suspension members 29 and 30 are used with each cylinder 27. The piston 28 has a cross head 31 at the top that carries a pair of wheels 32 and 33 over which the flexible members 29 and 30 are carried. One end of each flexible member is fixed to the cylinder top and the other end to the platform 26. The cylinders 27 and the pistons 28 have a combined height when the pistons are extended to carry the cross heads 31 high enough to bring the platform 26 to the top floor 12. When the pistons 28 are lowered into the cylinders, the flexible members 29 and 30 lower the platform 26 to the lowermost floor 12.

The four hydraulic lifts are made to keep the corners of the platform 26 at the same level by a leveling mechanism that is illustrated in Figures 5 and 6 of the drawings. Two cross shafts 34 and 35 are journalled in the platform 26. Each shaft has two sprocket wheels 36 and 37 fixed to each end thereof. A sprocket chain 38 cooperates with the sprocket wheels 37 at each end of the shafts 34 and 35. Another sprocket chain 39 cooperates with the sprocket wheels 36 at each end of the shafts 34 and 35. Each chain 38 has one end secured to the lower cross bar 19 and extends up over the sprocket wheel 37 on the adjacent end of the shaft 34, then across the platform end to the sprocket wheel 37 on the corresponding end of the shaft 35, beneath this sprocket wheel and then up to the top cross bar 19. Each chain 39 has one end secured to the lower cross bar 19 and extends up over the sprocket wheel 36 on the shaft 35, then across the platform end to the sprocket wheel 36 on the corresponding end of the shaft 34, beneath this sprocket wheel and then up to the top cross bar 19. The four chains, two shafts and eight sprocket wheels provide a simple mechanism to cause the platform 26 to move up and down without tipping due to uneven loading.

The mechanism hereinbefore described is one means for raising and lowering the platform 26 and for supporting it for movement lengthwise of the passageway between the stalls. While such means is a part of the combination that constitutes my invention, the particular construction of the hydraulic lifts and of the leveling mechanism are not claimed as my invention. Any suitable equivalent mechanisms for moving the platform 26 up and down and for supporting it for movement along the passageway may be used.

According to my invention I provide in combination with the platform 26, the elevator unit 14 and the series of stalls, a mechanism whereby the one elevator unit may bring automobiles to and remove them from the individual stalls with the least time consuming travel and the most flexibility in placing the automobiles in the stalls and removing them from the stalls. I make the platform 26 large enough to span two laterally adjacent stall openings and to carry two automobiles at a time. As a part of the platform I provide a turntable 40 with a suitable operating mechanism such as motors 41 and gearing 42 and 43 furnishes power to rotate the turntable on the framework of the platform 26. A multiplicity of wheels 44 on the turntable ride on a flanged ring 45 on the platform to carry the load separately from the gearing. The platform 26 and the turntable 40 have guide members thereon for guiding the automobiles or shuttle carriers for the automobiles on to the turntable 40 and off of the turntable. Two pairs of guide members 46 and 47 on the turntable can be aligned with corresponding pairs of guide members 48 and 49 on the platform. When the guide members are so aligned the turntable straight edges 50 and 51 align with the side edges of the platform 26.

Within each of the stalls on the floors 12, I also provide guiding members 52 and 53 to guide the automobiles on their carriers endwise of the stalls. The spacing of the guiding members 52 and 53 is such that those guiding members in two adjacent stalls align respectively with the pairs of guide members 48 and 49 when the platform 26 is positioned at a floor level with its longitudinal center line aligned with the columns between stalls. It will be appreciated that when the guiding members 52 and 53 and the members 46, 47, 48 and 49 are so aligned, automobiles may be moved into and out of two adjacent stalls without any movement of the elevator unit 14. One pair of automobiles on the turntable 40 can be moved into the back stalls of two adjacent spaces 13 on either side of the passageway. Two automobiles on the opposite side of the passageway can then be brought onto the turntable and delivered. If it is desired to put two cars end to end in the same space, the first car can be run into the back stall, then by turning the turntable a half rotation, the other car thereon can be run into the front stall of the same space 13 with no movement of the unit 14. The manipulations necessary to handle cars will be described more fully hereinafter.

The particular means for moving the automobiles to and from the turntable 40 may be varied. Known shuttle carriers may be used. Likewise by leaving the brakes off in the automobiles and utilizing pusher devices, the automobiles may be rolled into and out of the stalls on their own wheels. Many individuals prefer to close and lock their own automobiles. If they do so, they must leave the brakes off and the gear shift in neutral in order for the pushers to work. This is not necessary when one uses a carrier such as that illustrated in Figures 8, 9 and 10 or the equivalent thereof. Such a carrier picks up the automobile bodily so the wheels may be locked. The construction illustrated is a main framework 54 which is supported on four pairs of wheels 55. The wheels have shafts 56 journalled in the framework 54 and the shafts 56 are suitably powered by endless belts 57 from a motor 58. The motor 58 is reversible to drive the carrier endwise in either direction.

The framework 54 mounts a lifting framework 59 which is provided with plates 60 and 61 that support an automobile. The lifting framework 59 is so linked to the framework 54 by links 62 that the lifting framework can swing up and down but cannot move endwise. Wheels 63 are provided at the ends of the plates 60 and 61. These wheels are supported on wheel supported lifting platforms 64. There are four of the platforms 64, one for each wheel 63 to roll upon. Each platform has a lower horizontal portion 65, an inclined portion 66 and an upper horizontal portion 67. By applying force endwise of the platform 64, the inclined portion 67 can be moved under the wheel 63 and the wheel 63 raised from the portion 65 to the portion 67. End stops 68 and 69 are provided on the platform 64. The platform 64 is supported on the framework 54 by wheels 70 which roll on the lower flange 54a.

In order to move the lifting platforms 64 endwise of the framework 54 to raise and lower the plates 60 and 61, the platforms 64 at both ends of the framework 54 are connected by axles 71 and braces 72 to a rod 73. The rod 73 is moved endwise by a reversible motor 74 and a sprocket wheel and chain drive. One sprocket wheel 75 is driven by the motor 74. It drives the chain 76 which drives a sprocket wheel 77 which is threaded upon a screw threaded portion 73a of the rod 73. A cross plate 78 carries the motors 58 and 74. This plate also carries thrust members 79 and 80. The thrust members 79 and 80 carry thrust bearings 81 and 82 which are yieldingly held against the sprocket wheel 77 by springs 83. The springs 83 are guided by bolts 84 that are secured in the bearings 81 and 82 and slide in the thrust members 79 and 80. The springs 83 provide a cushioning means when the motor 74 starts to lift an automobile on the cross plates 60 and 61.

The means to control current supply to the motors 58 and 74 and to the motors 41 for the turntable 40 has not been shown. Any suitable control mechanism which will provide for the current supply under control of an operator on the platform 26 is sufficient.

The wheels 55 that support the carrier frameworks 54 ride on the turntable 40 and are guided by the guide members 46 and 47. There are two carrier frameworks 54, one for each pair of guide members 46 and 47. The carrier frameworks can be run off the turntable 40 and guided across the platform 26 by its guide members 48 and 49 to the guiding members 52 and 53 in the stalls. Figure 7 shows a simple stall floor construction that can be used to support the car load and yet be light. The cross beams 11 are provided at each floor between the columns 10. These beams carry plates 85 that extend the full length of the stalls. The plates 85 are reenforced by truss bars 86 that extend from cross beam 11 to cross beam 11 lengthwise of the stalls, the truss bars and plates being tied together at spaced points by the tie rods 87. The guiding members 52 and 53 are mounted on the plates 85 in such a position that the plates 85 carry the load of the carrier framework wheels 55. Light weight flooring strips 88, 89, and 90 extend from the plates 85 to the beams 11 that run lengthwise of the stalls between the columns. This is merely one way of providing the floors 12. Any other suitable construction may be employed.

Referring now to Figures 1 and 2 in particular, the operation of my parking system will be explained. It is believed to be clear from the foregoing description that an automobile can be picked up by each of the shuttle carrier frameworks 54 and carried on to the turntable 40 by running the framework beneath an automobile which is on any floor, then lifting the automobile and moving the carrier framework on to the turntable. The elevation of the framework 59 and cross plates 60 and 61 will lift the automobile wheels clear of the floor and keep them raised until the automobile is delivered from the turntable. In parking, the automobiles will usually be picked up at the ground floor which is arranged so the drivers may leave their cars in position to be picked up by one of the carriers. Two cars are picked up by the two carrier frameworks and placed on the turntable for elevation to the floor where they are to be parked. When the two automobiles are loaded on the turntable, they are moved by elevation of the platform 26 and lateral travel of the entire elevator unit 14 to the desired storage stall.

Referring now to Figure 1, the elevator is shown with two automobiles A and B which are to be stored. At the particular floor level there are only two open stall spaces, *a* and *b*. The operator first uses the carrier 54 for automobile A to place this automobile in the stall *a*. He then uses this same carrier to pick up automobile C and move it on to the turntable. (For orderly handling of automobiles they must be placed in a definite stall and kept there and a record made of the placing so that when that automobile is called for, the operator can locate it.) It is therefore necessary eventually to return automobile C to its place. The operator turns the turntable 180 degrees. This brings automobile B into position in front of stall *c* and automobile C in the position where automobile B is shown in Figure 1. The automobile B can now be moved by the carrier framework 54 that is supporting it into the rear stall *b*. When this is done the empty carrier framework is returned to the turntable, the turntable is returned 180 degrees and the automobile C is returned to its stall. The carrier framework 54 that moved automobile C is returned to the turntable 40. The two frameworks 54 are now empty and the elevator unit is free to pick up other automobiles and carry them down or to return to the first floor for two more automobiles.

The situation just described is one of the most difficult to be encountered in parking automobiles in a two length stall, multiple floor parking space. My parking system, even in this case provides for unloading both cars into the available spaces with only lateral or vertical movement necessary to arrive at the floor and in front of the stalls. With my parking system the amount of elevator travel to park and remove automobiles is very small per automobile. On the first floor, automobiles can be left by their owners locked and closed. For the floors immediately above the loading area no horizontal travel of the elevator unit is necessary. In a parking area of the size referred to hereinbefore, that is a fifty foot by one hundred foot ground space, the ground floor space should provide areas near the middle of the passageway for the cars to be received and delivered. The maximum travel of the elevator unit 14 from the mid position that it occupies in Figure 2 to reach any tier of stalls is only the width of two stalls, a matter of about sixteen feet.

The combination of the elevator unit 14 with its two pairs of guide members, the two carriers and the two automobile length stalls makes it possible to pick up any two automobiles on a floor that are called for, even though these two are in the back rows, without going down with one. In rush time unloading, when people are waiting to receive their automobiles, this is a great time saver. The empty turntable illustrated in Figure 2, can be rotated to align one carrier 54 with a stall where an automobile wanted is located. The front automobile is taken out and the rear automobile wanted can then be obtained by picking it up on the other carrier 54. The front automobile can then be returned to the rear empty stall and, by similar manipulation, a rear automobile in an opposite or adjacent stall can be brought on to the turntable. The only operations necessary are turntable and carrier operations with some horizontal movements of the elevator unit where the automobiles desired are not in horizontally adjacent stalls.

It is believed that the nature and advantages of my invention will be apparent from the foregoing description.

Having thus described my invention, I claim:

1. A parking system for automobiles comprising a storage structure having a plurality of bays of stalls in vertically spaced floors, each of said bays of stalls comprising two pairs of stalls arranged in side by side relationship with each stall of each pair of stalls communicating in end to end relationship to provide storage space for four automobiles in each bay, a non-rotatable elevator platform movable vertically across the open ends of the bays of stalls, a horizontally rotatable platform carried by and within the confines of said elevator platform, a pair of automobile receiving frames on said rotatable platform arranged in side by side relationship with the spacing of said frames corresponding to the spacing between pairs of stalls in each bay of stalls whereby automobiles may be conveyed from the frames of said rotatable platform into either of the pairs of stalls of a bay of stalls or interchanged between pairs of stalls of a bay of stalls without displacing the elevator platform.

2. The invention defined in claim 1 wherein said bays are arranged on opposite sides of the elevator platform.

3. The invention defined in claim 1 wherein the bays are arranged on opposite sides of the elevator platform and, wherein the bays are arranged in horizontal array and the elevator platform is horizontally movable between the opposed bays on each floor to a stationary position for operation of the rotatable platform.

References Cited in the file of this patent

UNITED STATES PATENTS

| | | |
|---|---|---|
| 1,554,584 | Lake | Sept. 22, 1925 |
| 1,861,461 | Traube | June 7, 1932 |
| 1,988,619 | Buettell | Jan. 22, 1935 |
| 2,280,567 | Austin | Apr. 21, 1942 |
| 2,303,656 | Orr | Dec. 1, 1942 |
| 2,626,065 | Sanders et al. | Jan. 20, 1953 |
| 2,691,448 | Lontz | Oct. 12, 1954 |